(12) United States Patent
Sukhotskiy et al.

(10) Patent No.: US 11,607,724 B2
(45) Date of Patent: Mar. 21, 2023

(54) ATMOSPHERE AND PART FORMATION IN A LIQUID METAL DROP-ON-DEMAND PRINTER

(71) Applicant: XEROX CORPORATION, Norwalk, CT (US)

(72) Inventors: Viktor Sukhotskiy, Buffalo, NY (US); David A. Mantell, Rochester, NY (US); Palghat S. Ramesh, Pittsford, NY (US); Kareem Tawil, Pittsford, NY (US); Alexander J. Fioravanti, Penfield, NY (US); Dinesh Krishna Kumar Jayabal, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 218 days.

(21) Appl. No.: 16/991,159

(22) Filed: Aug. 12, 2020

(65) Prior Publication Data
US 2021/0046541 A1 Feb. 18, 2021

Related U.S. Application Data

(60) Provisional application No. 62/885,941, filed on Aug. 13, 2019.

(51) Int. Cl.
*B22D 23/00* (2006.01)
*B33Y 50/02* (2015.01)
*B33Y 30/00* (2015.01)
*B33Y 10/00* (2015.01)

(52) U.S. Cl.
CPC ............ *B22D 23/003* (2013.01); *B33Y 10/00* (2014.12); *B33Y 30/00* (2014.12); *B33Y 50/02* (2014.12)

(58) Field of Classification Search
CPC .............................. B22D 23/00; B22D 23/003
USPC .................. 164/4.1, 46, 259, 271, 335, 337
See application file for complete search history.

(56) References Cited

U.S. PATENT DOCUMENTS

| | | | |
|---|---|---|---|
| 9,616,494 B2 | 4/2017 | Vader et al. | |
| 10,040,119 B2 | 8/2018 | Vader et al. | |
| 2014/0093658 A1* | 4/2014 | Zhao et al. | B23K 3/0607 427/595 |

* cited by examiner

*Primary Examiner* — Kevin P Kerns
(74) *Attorney, Agent, or Firm* — MH2 Technology Law Group LLP

(57) ABSTRACT

A three-dimensional (3D) printer includes an ejector and a heating element configured to heat a solid printing material in the ejector, thereby causing the solid printing material to change to a liquid printing material within the ejector. The 3D printer also includes a coil wrapped at least partially around the ejector. The 3D printer also includes a power source configured to supply one or more pulses of power to the coil, which cause one or more drops of the liquid printing material to flow out of the ejector through a nozzle of the ejector. The 3D printer also includes a gas-controlling device configured to control a gas in the 3D printer.

22 Claims, 6 Drawing Sheets

ATMOSPHERE AND PART FORMATION IN A LIQUID METAL DROP-ON-DEMAND PRINTER

CROSS-REFERENCE TO RELATED APPLICATIONS

This application claims priority to U.S. Provisional Patent Application No. 62/885,941, filed on Aug. 13, 2019, which is incorporated by reference herein in its entirety.

TECHNICAL FIELD

The present teachings relate generally to three-dimensional (3D) printing and, more particularly, to systems and methods for controlling properties of a metal used to print a 3D object.

BACKGROUND

A 3D printing process builds a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for jetting liquid metal and its alloys layer upon layer to form a 3D metallic object. Magnetohydrodynamic refers to the study of the magnetic properties and the behavior of electrically conducting fluids.

An MHD printer causes an electrical current to flow through a metal coil, which produces time-varying magnetic fields that induce eddy currents within a reservoir of liquid metal compositions. Coupling between magnetic and electric fields within the liquid metal results in Lorentz forces that cause ejection of drops of the liquid metal through a nozzle of the printer. The nozzle may be controlled to select the size and shape of the drops.

The drops land upon the substrate and/or the previously deposited (and now solidified) drops to cause the object to grow in size. Typically, the coalescence and flow of the liquid drops are controlled by controlling the temperature of the drops. However, it would be desirable to be able to control the coalescence and flow of the liquid drops in other ways.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A three-dimensional (3D) printer is disclosed. The 3D printer includes an ejector and a heating element configured to heat a solid printing material in the ejector, thereby causing the solid printing material to change to a liquid printing material within the ejector. The 3D printer also includes a coil wrapped at least partially around the ejector. The 3D printer also includes a power source configured to supply one or more pulses of power to the coil, which cause one or more drops of the liquid printing material to flow out of the ejector through a nozzle of the ejector. The 3D printer also includes a gas-controlling device configured to control a gas in the 3D printer.

In another embodiment, the 3D printer includes a nozzle configured to eject one or more drops of a liquid metal. The 3D printer also includes a substrate configured to have the one or more drops land thereon and subsequently solidify to form a 3D object. The 3D printer also includes a first sensor configured to measure a concentration of a first gas, a second gas, or both in a transit region. The transit region is a volume that is within 10 cm of the nozzle, the one or more drops, the 3D object, or a combination thereof. The 3D printer also includes a second sensor configured to measure a pressure in the transit region. The 3D printer also includes a first gas source configured to introduce the first gas into the transit region. The first gas source is configured to vary a volumetric flow rate of the first gas in response to the measured concentration, the measured pressure, or both. The first gas is an inert gas, a nitrogen gas, or both. The 3D printer also includes a second gas source configured to introduce the second gas into the transit region. The second gas source is configured to vary a volumetric flow rate of the second gas in response to the measured concentration, the measured pressure, or both. The second gas is oxygen.

A method for printing a three-dimensional (3D) object using a 3D printer is also disclosed. The method includes causing one or more drops of a liquid metal to pass through a nozzle and fall onto a substrate. The one or more drops of the liquid metal solidify on the substrate to form the 3D object. The method also includes controlling a gas within a transit region of the 3D printer while the one or more drops of the liquid metal pass through the nozzle, fall onto the substrate, and solidify on the substrate.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Figure 1:
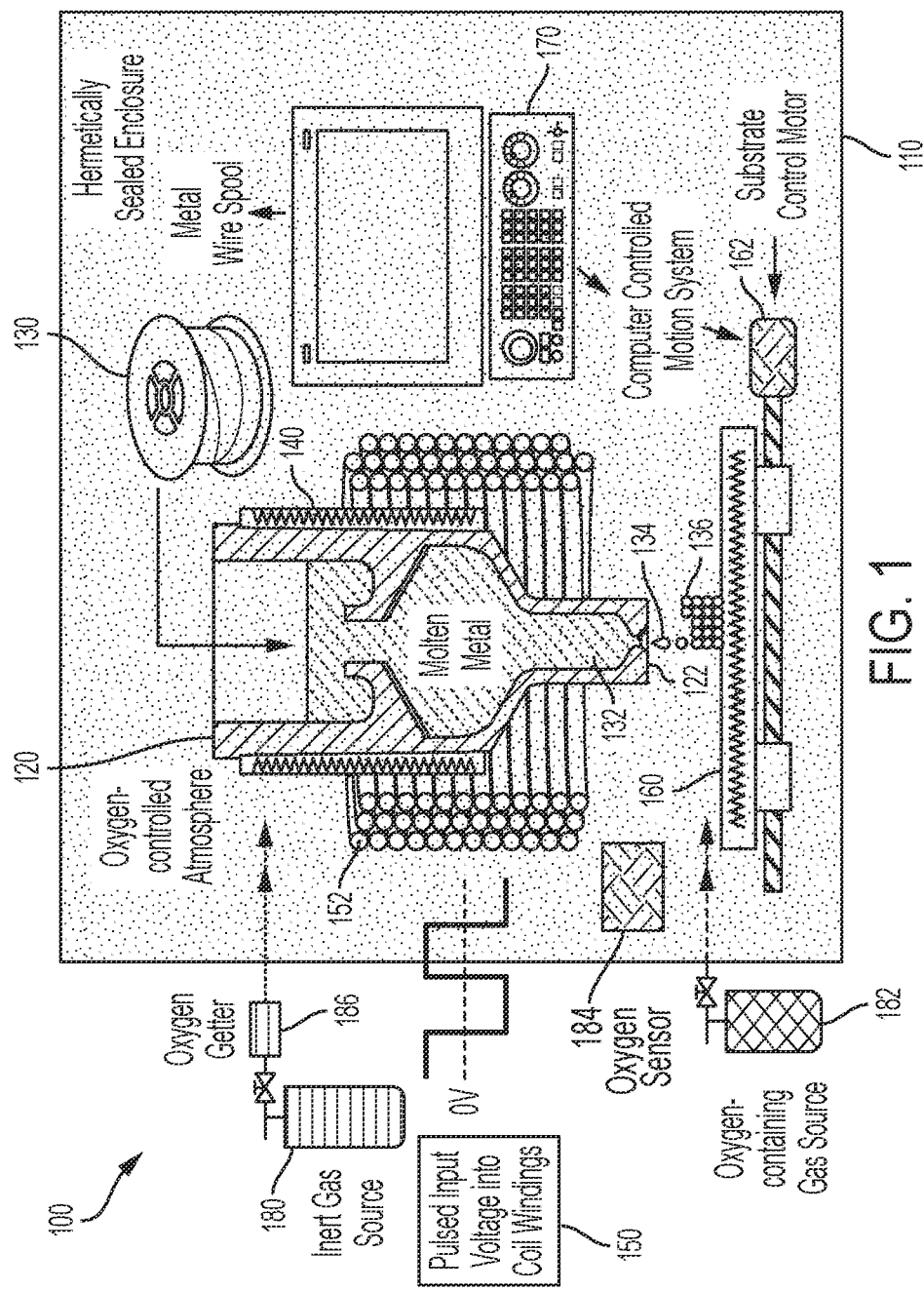
FIG. 1 depicts a schematic cross-sectional view of a 3D printer having one or more gas sources for controlling a gas concentration in inner volume of the 3D printer, according to an embodiment.

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure describes systems and methods for controlling properties of a (e.g., liquid) metal used to print a 3D object. The properties may be or include viscosity or flow rate of the metal through the nozzle of the 3D printer, on the substrate below the nozzle, or on a previously deposited drop/layer of the printed 3D object. The properties may also or instead include the coalescence of drops of the liquid metal after passing through the nozzle, on the substrate below the nozzle, or on a previously deposited drop/layer of the printed 3D object. The properties may also or instead include the solidification of the drops of the metal after passing through the nozzle, on the substrate below the nozzle, or on a previously deposited drop/layer of the printed 3D object. The properties may also or instead include the contact angle of the drops of the liquid metal during the time that they are coalescing and solidifying.

The properties of the metal may be controlled by controlling the amount of gaseous oxygen, water vapor, or oxygen-containing gases proximate to the drops of metal and/or the 3D object. More particularly, the oxygen-containing atmosphere of the 3D printer may impact the contact angle, flow, coalescence, and/or solidification of the metal drops during the printing process.

By controlling the gas around the 3D object during the printing process, the properties of the drops of liquid metal (e.g., contact angle, flow, coalescence, and/or solidification) may be tailored for the desired 3D object. Oxygen, for example, helps to speed up the solidification/freezing of the surface of the metal drops and reduces the time during which the liquid metal drops are able to flow on the substrate or the previously printed layer(s) of the 3D object. Controlling the oxygen around the drops and/or the 3D object may allow optimization of the drop solidification independently from, or in conjunction with, varying the temperature of the drops and/or the 3D object.

As described in greater detail below, controlling the gas in the 3D printer may be done in several different ways. For example, the atmosphere inside the 3D printer may be controlled to have a desired concentration of oxygen. In another example, a sheath gas of known composition may be formed around the nozzle, the drops, and/or the 3D object (e.g., the coalescence regions). In another example, the pressure inside the enclosure of the 3D printer may be different (e.g., greater or less) than atmospheric pressure. In yet another example, a gas may be directed toward the drops and/or the 3D object during the printing process.

The concentration of the gases may be controlled proximate to the location where the drops land on the substrate and/or the 3D object. The transition from liquid to solid may occur rapidly enough to reduce unwanted flow but not too rapidly to prevent the drops from joining to form a solid layer on the 3D object.

Different metal alloys may have different flow properties. For example, some metal alloys may flow more easily than others. Metal alloys that do not flow easily may require less oxygen or oxygen-containing gases in the transit region. As a result, the 3D printer may be operated at different settings depending at least partially upon the metal or metal alloy that is used to produce the 3D object. The settings of the 3D printer may be based on the metal and/or the alloy.

FIG. 1 depicts a schematic cross-sectional view of a 3D printer 100, according to an embodiment. The 3D printer 100 may include an enclosure 110 that defines an inner volume (also referred to as an atmosphere). The enclosure 110 may be hermetically sealed. The 3D printer 100 may also include an ejector (also referred to as a body or pump chamber) 120. As shown, the ejector 120 may be positioned at least partially within the inner volume of the enclosure 110. In other embodiments, the ejector 120 may be positioned outside of the enclosure 110. The ejector 120 may also define an inner volume (also referred to as a cavity). The ejector 120 may also include a nozzle 122.

A printing material 130 may be introduced into the inner volume of the ejector 120. The printing material 130 may be or include a metal, a polymer, or the like. For example, the printing material 130 may be or include aluminum. In the embodiment shown, the printing material 130 is a spool of aluminum wire.

The 3D printer 100 may also include one or more heating elements 140. As shown, the heating elements 140 may be positioned at least partially within the inner volume of the enclosure 110. In other embodiments, the heating elements 140 may be positioned outside of the enclosure 110. The heating elements 140 are configured to melt the printing material 130, thereby converting the printing material 130 from a solid to a liquid (e.g., molten) metal 132 within the inner volume of the ejector 120.

The 3D printer 100 may also include a power source 150. As shown, the power source 150 may be positioned outside of the enclosure 110; however, in other embodiments, the power source 150 may be positioned within the enclosure 110. The 3D printer 100 may also include one or more metallic coils 152 that are wrapped at least partially around the ejector 120. The power source 150 may be coupled to the coils 152 and configured to provide an electrical current thereto. In one embodiment, the power source 150 may be configured to provide a step function direct current (DC) voltage profile (e.g., voltage pulses) to the coils 152, which may create an increasing magnetic field. The increasing magnetic field may cause an electromotive force within the ejector 120, that in turn causes an induced electrical current in the liquid metal 132. The magnetic field and the induced electrical current in the liquid metal 132 may create a radially inward force on the liquid metal 132, known as a Lorentz force. The Lorentz force creates a pressure at an inlet of the nozzle 122. The pressure causes the liquid metal 132 to be expelled through the nozzle 122 in the form of one or more drops 134.

The 3D printer 100 may also include a substrate 160 that is positioned within the enclosure 110 and below the nozzle 122. The drops 134 may land on the substrate 160 and solidify to produce a 3D object 136. The 3D printer 100 may also include a substrate control motor 162 that is configured to move the substrate 160 as the drops 134 are being expelled (i.e., during the printing process) to cause the 3D object 136 to have the desired shape and size. The substrate control motor 162 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 120 and/or the nozzle 122 may be also or instead be configured to move in one, two, or three dimensions.

The 3D printer 100 may also include a computing system 170. The computing system 170 may be positioned within the enclosure 110 (as shown), or it may be positioned outside of the enclosure 110. The computing system 170 may be configured to control the introduction of the printing material 130 into the ejector 120, the heating elements 140, the power source 150, the substrate control motor 162, or a combination thereof.

The 3D printer 100 may also include one or more gas-controlling devices, which may be or include gas sources (two are shown: 180, 182). As shown, the gas sources 180, 182 may be positioned outside of the enclosure 110 and configured to introduce gas into the enclosure 110. In another embodiment, the gas sources 180, 182 may be positioned within the enclosure 110. The first gas source 180 may be configured to introduce a first gas into the enclosure 110. The first gas may be or include an inert gas, such as helium, neon, argon, krypton, and/or xenon. In another embodiment, the first gas may be or include nitrogen. The first gas may include less than about 10% oxygen, less than about 5% oxygen, or less than about 1% oxygen.

In at least one embodiment, the first gas may be introduced into the enclosure 110 at a location that is above where the second gas is introduced into the enclosure 110. For example, the first gas may be introduced at a location that is above the nozzle 122 and/or the coils 152. This may allow the first gas (e.g., argon) to form a shroud/sheath around the nozzle 122, the drops 134, the 3D object 136, and/or the substrate 160 to reduce/prevent the formation of oxide (e.g., aluminum oxide). Controlling the temperature of the gas that is introduced may also or instead help to control (e.g., minimize) the rate that the oxide formation. The temperature of the gas may be controlled, for example, using the heater discussed below.

The second gas source 182 may be configured to introduce a second gas into the enclosure 110. The second gas may be different than the first gas. The second gas may be or include oxygen, water vapor, carbon dioxide, nitrous oxide, ozone, methanol, ethanol, propanol, or a combination thereof. The second gas may include less than about 10% inert gas and/or nitrogen, less than about 5% inert gas and/or nitrogen, or less than about 1% inert gas and/or nitrogen. The second gas may be introduced at a location that is below the nozzle 122 and/or the coils 152. For example, the second gas may be introduced at a level that is between the nozzle 122 and the substrate 160. The second gas may be directed toward the nozzle 122, the falling drops 134, the 3D object 136, the substrate 160, or a combination thereof. This may help to control the properties (e.g., contact angle, flow, coalescence, and/or solidification) of the metal.

The 3D printer 100 may also include another gas-controlling device, which may be or include a gas sensor 184 that is positioned within the enclosure 110. The gas sensor 184 may be configured to measure a concentration of the first gas, the second gas, or both within the enclosure 110. More particularly, the gas sensor 184 may be configured to measure the concentration proximate to the nozzle 122, the falling drops 134, the 3D object 136, the substrate 160, or a combination thereof. As used herein, "proximate to" refers to within about 10 cm, within about 5 cm, or within about 1 cm.

The first gas source 180, the second gas source 182, and/or the gas sensor 184 may be in communication with the computing system 170. More particularly, the computing system 170 may be configured to receive the measurements from the gas sensor 184, and also configured to control the first gas source 180 and/or the second gas source 182, based at least partially upon the measurements from the gas sensor 184, to obtain the desired gas concentration within the enclosure 110. In at least one embodiment, the concentration of the first gas (e.g., nitrogen) may be maintained between about 65% and about 99.999%, between about 65% and about 75%, between about 75% and about 85%, between about 85% and about 95%, or between about 95% and about 99.999%. In at least one embodiment, the concentration of the second gas (e.g., oxygen) may be maintained between about 0.000006% and about 35%, between about 0.000006% and about 0.00001%, between about 0.00001% and about 0.0001%, between about 0.0001% and about 0.001%, between about 0.001% and about 0.01%, between about 0.01% and about 0.1%, between about 0.1% and about 1%, between about 1% and about 10%, or between about 10% and about 35%.

The 3D printer 100 may also include another gas-controlling device, which may be a gas remover (also referred to as a gas getter) 186. In at least one embodiment, the gas remover 186 may be configured to remove oxygen from the first gas prior to introducing the first gas into the enclosure 110. In this embodiment, the second gas source 182 may be turned off or omitted. Removing the oxygen from the first gas may allow the level of the second gas (e.g., oxygen) in the enclosure 110 to be reduced to a low level (e.g., less than about 1%, less than about 0.1%, less than about 0.01%, less than about 0.001%, less than about 0.0001%, less than about 0.00001%) to provide the benefit of reducing the oxidation of the liquid drops 134 and/or the solid metal substrate 160. For example, the oxygen level may be reduced to about or about 0.000006%.

Figure 2:
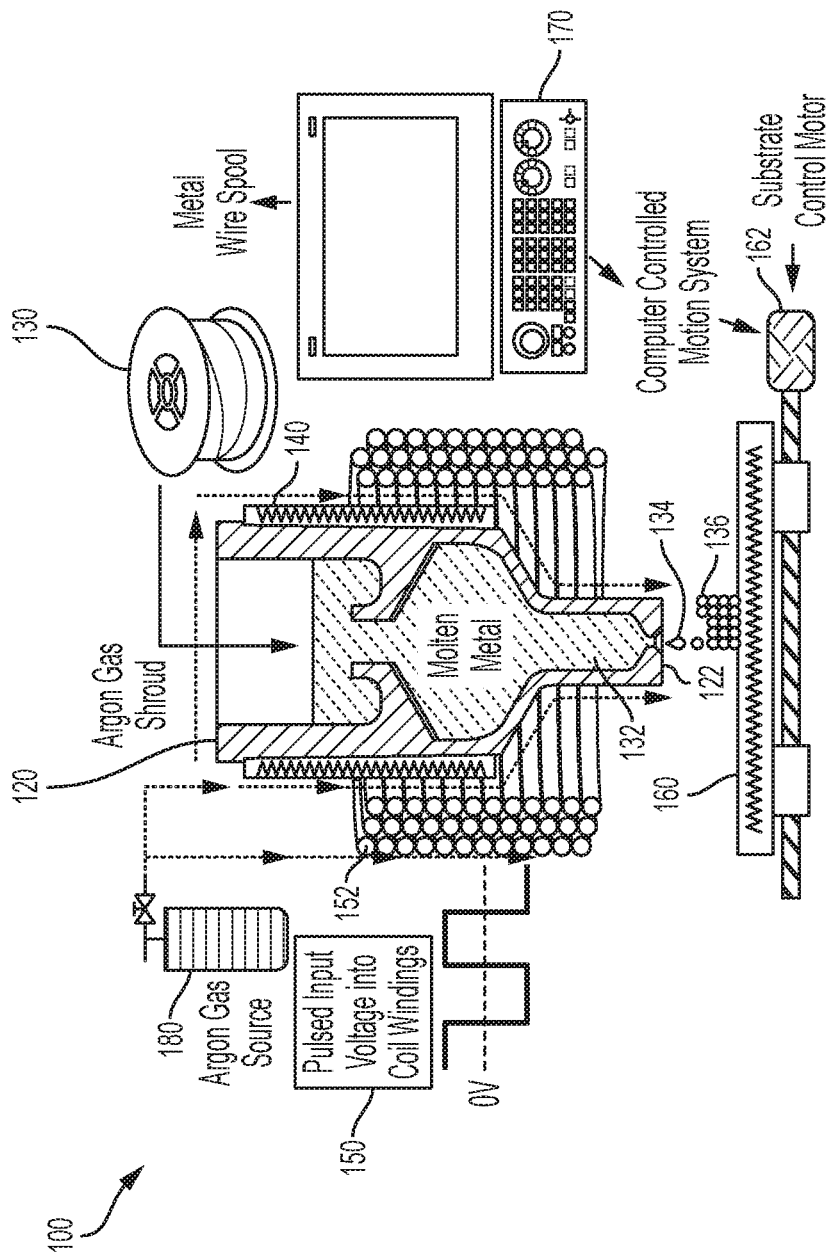
FIG. 2 depicts a schematic cross-sectional view of the 3D printer having the one or more gas sources control the gas concentration in a transit region of the inner volume of the 3D printer, according to an embodiment.

FIG. 2 depicts a schematic cross-sectional view of the 3D printer 100 having the one or more gas sources 180, 182 control the gas concentration in a transit region of the inner volume of the 3D printer 100, according to an embodiment. The enclosure 110 may be omitted in this embodiment. As used herein, the "transit region" refers to the area/volume proximate to (e.g., within 10 cm, 5 cm, or 1 cm of) the nozzle 122, the falling drops 134, the 3D object 136, the substrate 160, or a combination thereof. The transit region may also or instead include the area/volume where the printing material 130 is converted from a solid metal into the liquid metal 132 (e.g., within the ejector 120), the area/volume where the liquid metal 132 is converted to drops 134 (e.g., in the nozzle 122), the area/volume where the drops 134 fall from the nozzle 122 to the substrate 160, the area/volume where the drops 134 form the 3D object 136 on the substrate 160, or a combination thereof. For example, as shown by the dashed lines in FIG. 2, the first gas (e.g., argon) may be directed to flow downward around the ejector 120. More particularly, a portion of the first gas flows downward between the ejector 120 and the coils 152, and another portion of the first gas flows downward outside the coils 152. The first gas then flows around the nozzle 122 and downward toward the substrate 160, such that the drops 134 and the 3D object 136 are surrounded by the first gas. The drops 134 solidify quickly on the substrate 160 (or the previously deposited drops), and thus the gas is present through the time where the liquid drops 134 form the 3D object 136.

The concentration of the first gas and/or the second gas in the transit region may be different (e.g., higher) in the embodiment of FIG. 2 than in the embodiment of FIG. 1. The concentration of gas may be partially controlled by the composition of the first gas (e.g., also referred to as a sheath gas). This may be at least partially due to the surrounding atmosphere diffusing into the sheath. As a result, the concentration varies as a function of the distance from the nozzle 122 as the gas pressure reduces and there is more time for diffusion. The embodiment of FIG. 2 may have a higher flow rate of the sheath gas than the embodiment of FIG. 1. This higher flow rate allows for the replenishing of the first gas, whereas this is absent in the embodiment of FIG. 1.

Figure 3:
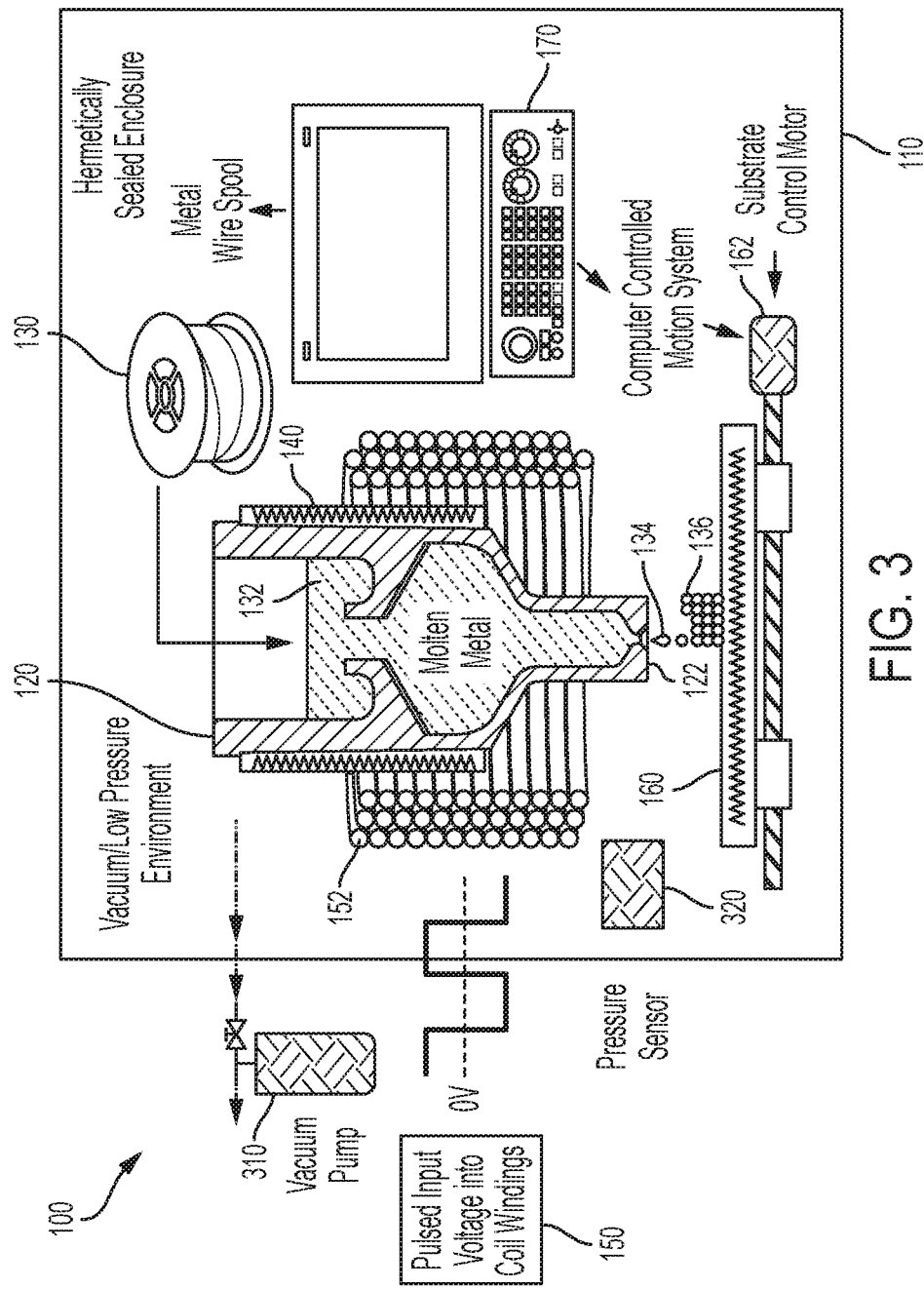
FIG. 3 depicts a schematic cross-sectional view of the 3D printer having a pump for controlling a pressure in the inner volume of the 3D printer, according to an embodiment.

FIG. 3 depicts a schematic cross-sectional view of the 3D printer 100 having a pump 310 and a pressure sensor 320 for controlling a pressure in the enclosure 110, according to an embodiment. The pump 310 and the pressure sensor 320 may also be gas-controlling devices. The pressure sensor 320 may be configured to measure the pressure within the enclosure 110 (e.g., in the transit region), and the pump 310 may be configured to vary the pressure within the enclosure 110 (e.g., within the transit region) based at least partially upon the measured pressure. In one embodiment, the pump 310 and the pressure sensor 320 may be in communication with the computing system 170. In this embodiment, the pressure sensor 320 may measure the pressure inside the enclosure 110 and transmit the measured pressure to the computing system 170. In response to the measured pressure, the computing system 170 may cause the pump 310 to vary the pressure inside the enclosure 110. For example, when the measured pressure is above a predetermined threshold, the computing system 170 may cause the pump (e.g., a vacuum pump) 310 to remove a portion of the gas within the enclosure 110 to reduce the pressure in the enclosure 110.

The amount of gas in the transit region may depend upon the pressure within the enclosure 110. For example, when the pressure inside the enclosure 110 is reduced, this may reduce the amount of gas (e.g., oxygen) around the nozzle 122, the drops 134, the 3D object 136, and/or the substrate 160. This may reduce the oxide formation on the surface of the 3D object 136. It can also reduce the diffusion of the atmospheric gas into the sheath gas, thus providing greater control of the surface properties of the drops 134 as they impact the substrate 160 and/or the 3D object 136.

In at least one embodiment, the oxygen level may be increased on the surface of the drops 134 to reduce flow by controlling (e.g., increasing) the oxygen in the sheath gas, while (e.g., simultaneously) reducing the overall oxygen and oxidation at the surface of the 3D object 136 by reducing the concentration of oxygen in the atmosphere.

Figure 4:
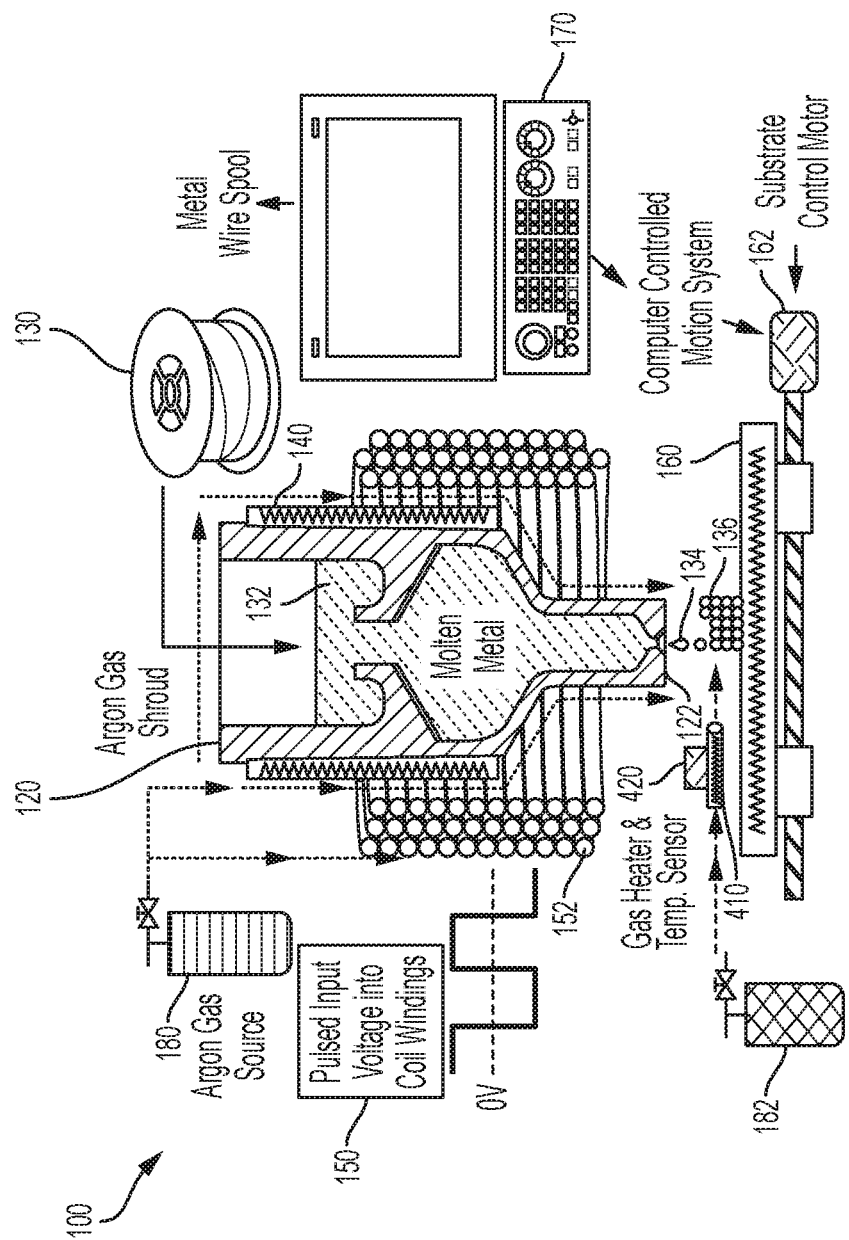
FIG. 4 depicts a schematic cross-sectional view of the 3D printer having the one or more gas sources direct gas at the liquid drops and/or at the object, according to an embodiment.

FIG. 4 depicts a schematic cross-sectional view of the 3D printer 100 having the gas source(s) 180, 182 configured to direct (e.g., blow) gas at the liquid drops 134 and/or at the object 136, according to an embodiment. The gas source(s) 180, 182 may be configured to direct the gas (e.g., argon, nitrogen, and/or air) at the nozzle 122, the drops 134, the 3D object 136, and/or the substrate 160. This may vary (e.g., increase) the oxygen concentration around the drops 134 and/or the 3D object 136. The stream of gas from the gas source 182 may drag along the background gases in the enclosure 110 and increase their effect on the coalescence on the surface of the 3D object 136 and/or the substrate 160.

In one embodiment, the gas source(s) 180, 182 may be in communication with the computing system 170. For example, the computing system 170 may turn/switch the gas on when printing a first portion (e.g., infill and/or perimeters) of the 3D object 136, and turn/switch the gas off when printing the a second portion (e.g., bridges and/or overhangs) of the 3D object 136. The infills and perimeters may have a thickness greater than a predetermined threshold, and the bridges and overhangs may have a thickness less than the predetermined threshold. The gas can also be turned/switched on while printing a first layer of the 3D object 136 on the substrate 160 to ensure adherence of the first layer to the substrate 160, and turned/switched off while printing one or more subsequent layers. The computing system 170 may also cause the gas source(s) 180, 182 to pulse on and off in coordination with the power source 150. As used herein, a "pulse" of gas lasts less than or equal to 1 second, less than or equal to 0.5 seconds, or less than or equal to 0.1 seconds. The pulses of gas may begin slightly (e.g., from about 0.1 s to about 0.5 s) before the pulses of power that cause the drops 134 to fall because the speed of the drops 134 is greater than the speed of the gas. In one example, a first pulse of gas may occur, then a first drop 134 may pass through the nozzle 122, and then a second pulse of gas may occur, and then a second drop may pass through the nozzle 122. This may all occur within less than about 5 seconds, less than about 3 seconds, or less than about 1 second.

The gas source(s) 180, 182 may direct gas at a drop 134 while the drop 134 is ejected from the nozzle 122 and falling toward the substrate 160. This may increase the amount of oxygen-carrying molecules in the area around the drops 134, the 3D object 136, and/or the substrate 160 at times when it is beneficial (e.g., while the drops 134 are in liquid form and/or falling), and not at times when it is less beneficial (while no drops 134 are falling and/or the 3D object 136 has solidified).

The 3D printer 100 may also include additional gas-controlling devices, such as a heater 410 and a temperature sensor 420 that are positioned within the enclosure 110 (e.g., in the transit region). More particularly, the heater 410 and/or the temperature sensor 420 may be positioned proximate to the drops 134 and/or the 3D object 136 (e.g., below the nozzle 122 and/or coils 152 and above the substrate 160). The heater 410 may be or include a gas heater that is configured to increase the temperature locally around the drops 134, the 3D object 136, and/or the substrate 160. The temperature sensor 420 may be configured to measure the temperature locally around the drops 134, the 3D object 136, and/or the substrate 160.

In one embodiment, the heater 410 and the temperature sensor 420 may be in communication with the computing system 170. In this embodiment, the temperature sensor 420 may measure the temperature around the drops 134, the 3D object 136, and/or the substrate 160 and transmit the measured temperature to the computing system 170. In response to the measured temperature, the computing system 170 may cause the heater 410 to vary the temperature around the drops 134, the 3D object 136, and/or the substrate 160. For example, when the measured temperature is below a predetermined threshold, the computing system 170 may cause the heater 410 to increase the temperature around the drops 134, the 3D object 136, and/or the substrate 160. The heater 410 may maintain the temperature of the drops 134, the 3D object 136, and/or the substrate 160 within a predetermined range during the printing process, which prevents the drops 134 from cooling too quickly so that the drops 134 will solidify as intended.

In at least one embodiment, the volumetric flow rate of the first and/or second gas may be varied independently from or in conjunction with the heater 410 to control coalescence of the drops 134 and/or the 3D object 136. For example, the volumetric flow rate of the second gas may be increased or decreased while heat is applied.

In at least one embodiment, the first gas source and/or the second gas source may be turned on and off during the printing of the 3D object 136. For example, the second gas source may be turned on to direct the second gas to the drops 134 and/or the 3D object 136 during portions of the printing process that require less flow of the liquid metal (e.g., bridges or overhangs). This may increase oxygen and thus decrease flow. The second gas source may also be turned down (e.g., to reduce the volumetric flow rate) or off during other portions of the printing process that require more flow of the liquid metal (e.g., infill). This may decrease oxygen and thus increase flow.

Figure 5:
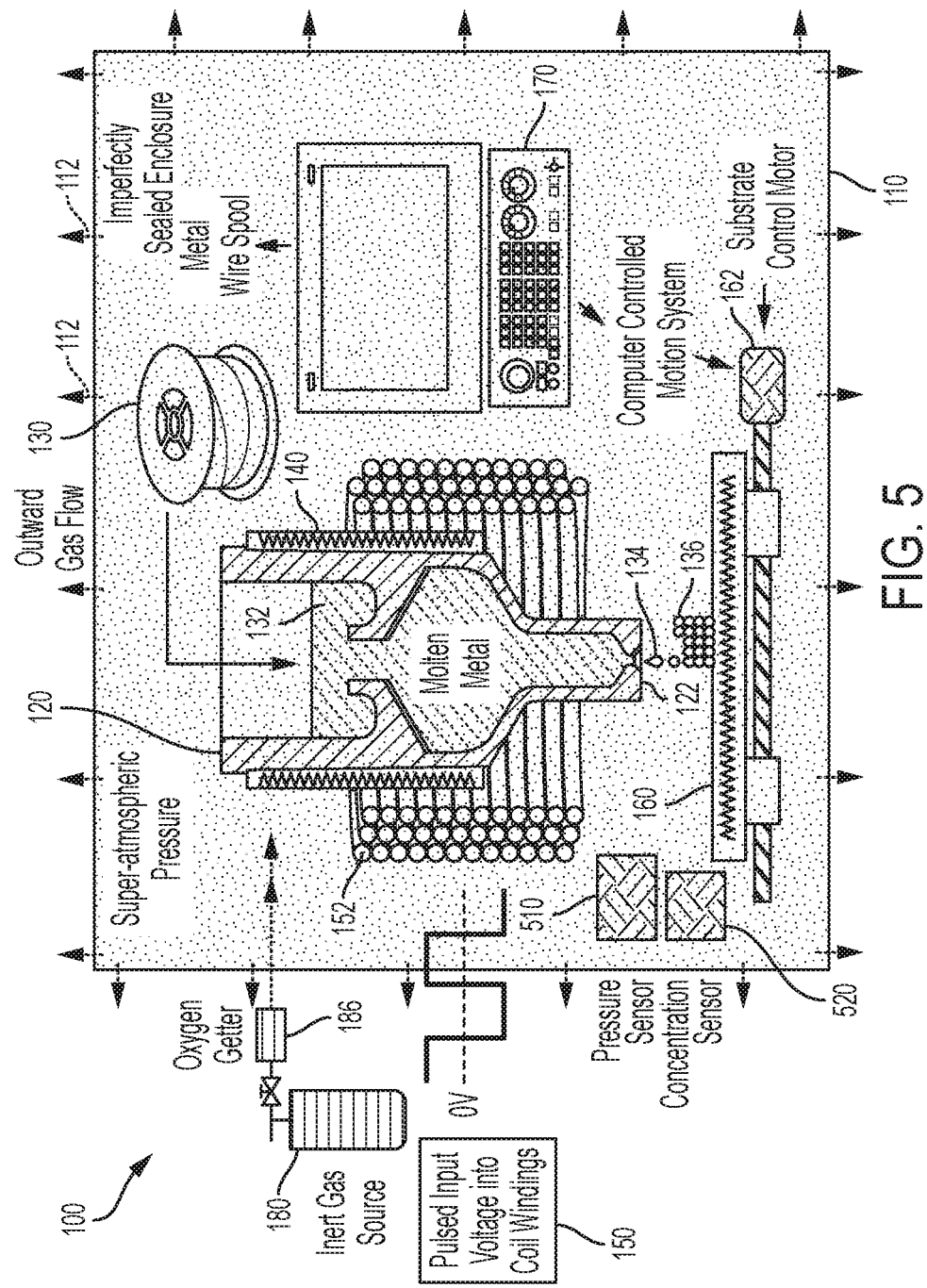
FIG. 5 depicts a schematic cross-sectional view of the 3D printer having the inner volume pressurized such that gas flows out of the inner volume, thereby preventing exterior gas from flowing into the inner volume, according to an embodiment.

FIG. 5 depicts a schematic cross-sectional view of the 3D printer 100 having one or more openings 112 in the enclosure 110 through which gas may escape, according to an embodiment. The pressure within the enclosure 110 may be greater than atmospheric pressure. For example, the gas source 180 may introduce the first gas into the enclosure 110, which causes the pressure to between about 0.1 inches above atmospheric pressure and about 1 inch above atmospheric pressure. The increased pressure and the openings 112 in the enclosure 110 may cause the gas to flow out of the enclosure 110 through the openings 112. This outward flow of gas may prevent gas from flowing into the enclosure 110 from an exterior of the enclosure 110.

The 3D printer 100 may also have another gas-controlling device, such as a pressure sensor 510 positioned within the enclosure 110 (e.g., in the transit region). In one embodiment, the gas source 180 and the pressure sensor 510 may be in communication with the computing system 170. In this embodiment, the pressure sensor 510 may measure the pressure within the enclosure 110 and transmit the measured pressure to the computing system 170. In response to the measured pressure, the computing system 170 may cause the gas source 180 to vary the volumetric rate of the first gas that is introduced into the enclosure 110. For example, when the measured pressure is below a predetermined threshold, the computing system 170 may cause the gas source 180 to increase the volumetric rate of the first gas introduced into the enclosure 110, and when the measured pressure is above the predetermined threshold, the computing system 170 may cause the gas source 180 to decrease the volumetric rate of the first gas introduced into the enclosure 110. Alternatively, the enclosure 110 may be at least partially evacuated so that the enclosure atmosphere will have little effect, and the gas proximate to the drops 134, the 3D object 136, and/or the substrate 160 may be controlled primarily by the composition and flow of the gas flowing at the print region.

In at least one embodiment, the 3D printer 100 may also have yet another gas-controlling device, such as a gas concentration sensor 520 positioned within the enclosure 110 (e.g., in the transit region). The gas source 180 and the gas concentration sensor 520 may be in communication with the computing system 170. In this embodiment, the gas concentration sensor 520 may measure the concentration of the gas within the enclosure 110 and transmit the measured concentration to the computing system 170. In response to the measured concentration, the computing system 170 may cause the gas source 180 to vary the volumetric rate of the first gas that is introduced into the enclosure 110 to maintain the concentration within a predetermined range around the drops 134 and/or the 3D object 136.

At least a portion of the embodiments of FIGS. 1-5 may be combined. For example, the first gas may be used to form the sheath in any/all embodiments. In another example, one or more embodiments may be combined to increase the oxygen level on the surface of the drops 134 to reduce flow by controlling (e.g., increasing) the oxygen in the sheath gas, while (e.g., simultaneously) reducing the overall oxygen and oxidation at the surface of the 3D object 136 by reducing the concentration of oxygen in the atmosphere. In addition, the pulsed application of the second gas by the second gas source 182 on the drops 134 and/or the newest layer of the 3D object 136 may occur.

Figure 6:
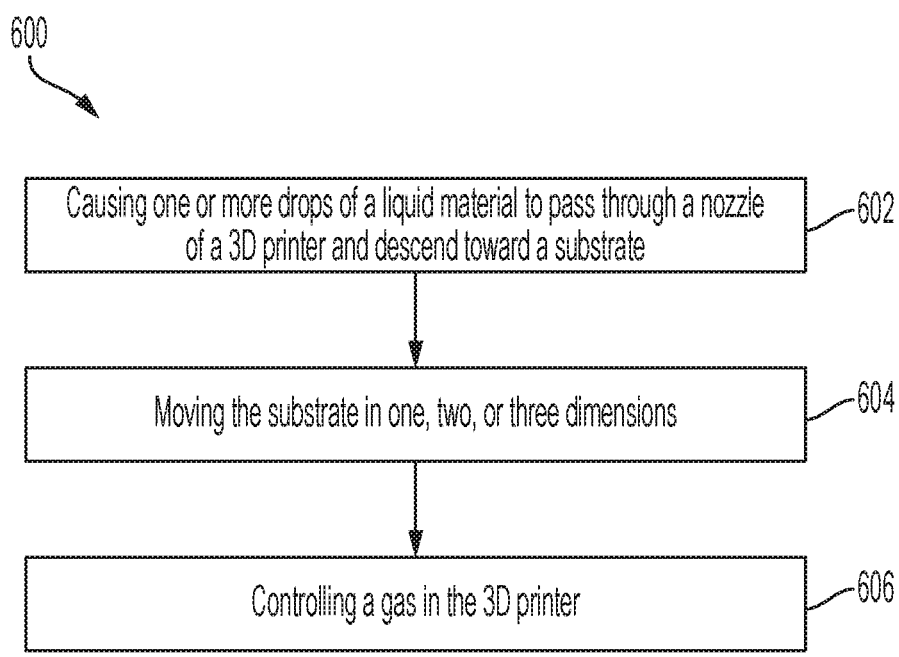
FIG. 6 illustrates a flowchart of a method for printing the object using the 3D printer, according to an embodiment.

FIG. 6 illustrates a flowchart of a method 600 for printing the 3D object 136 using the 3D printer 100, according to an embodiment. An illustrative order of the method 600 is provided below. One or more steps of the method 600 may be performed in a different order, repeated, or omitted.

The method 600 may include causing one or more drops of liquid material 134 to pass through the nozzle 122 and descend toward the substrate 160, as at 602. As discussed above, the power source 150 may provide one or more pulses of power to the coils 152 to cause the drop(s) of the liquid material 134 to pass through the nozzle 122 and descend toward the substrate 160. The liquid material may be or include liquid metal (e.g., aluminum).

The method 600 may also include moving the substrate 160 in one, two, or three dimensions, as at 604. More particularly, the substrate 160 may move so that the drops of liquid material 134 land in the desired locations to form the 3D object 136. In another embodiment, the ejector 120 and/or the nozzle 122 may move instead of or in addition to the substrate 160.

The method 600 may also include controlling a gas within the enclosure 110, as at 606. In one embodiment, controlling the gas may include introducing the first gas (e.g., argon) into the enclosure 110 using the first gas source 180 and/or the introducing the second gas (e.g., oxygen) into the enclosure 110 using the second gas source 182, as shown in FIG. 1. More particularly, controlling the gas may include measuring a gas concentration (e.g., of the first gas and/or the second gas) within the enclosure 110 using the gas sensor 184, and varying the concentration of the gas (e.g., the first gas and/or the second gas) within the enclosure 110 using the gas source(s) 180, 182 based at least partially upon the measured gas concentration. In another embodiment, controlling the gas may also or instead include removing at least a portion of the second gas (e.g., oxygen) from the stream of the first gas and/or from the enclosure 110 using the gas remover 186.

In another embodiment, controlling the gas may also or instead include directing the first gas into the transit region using the first gas source 180, as shown in FIG. 2. In another embodiment, controlling the gas may also or instead include directing the second gas into the transit region using the second gas source 182. This may cause the concentration of the first gas and/or the second gas to be higher in the transit region than outside of the transit region.

In another embodiment, controlling the gas may also or instead include controlling a pressure of the gas in the enclosure 110. More particularly, controlling the gas may include measuring the pressure of the gas in the enclosure 110 using the pressure sensor 320, and varying (e.g., reducing) the pressure of the gas using the pump 310 based at least partially upon the measured pressure, as shown in FIG. 3.

In another embodiment, controlling the gas may also or instead include directing gas (e.g., oxygen) at the drops 134, the 3D object 136, and/or the substrate 160, as shown in FIG. 4. In another embodiment, controlling the gas may also or instead include controlling a pressure of the gas in the enclosure 110. More particularly, controlling the gas may include measuring the pressure of the gas inside the enclosure 110 using the pressure sensor 510, and varying the pressure of the gas inside the enclosure 110 using the gas source 180 (or 182) based at least partially upon the measured pressure, as shown in FIG. 5.

Controlling the gas in any of these manners may control one or more of the properties of the (e.g., liquid) metal 132, 134 used to print the 3D object 136. As mentioned above, these techniques are alternatives to the conventional techniques that control the properties of the liquid metal solely by controlling the temperature of the liquid metal within the ejector of the 3D printer before the liquid metal passes through the nozzle of the 3D printer.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A three-dimensional (3D) printer, comprising:
an enclosure having an ejector positioned therein;
a heating element configured to heat a solid printing material in the ejector, thereby causing the solid printing material to change to a liquid printing material within the ejector;
a coil wrapped at least partially around the ejector;
a power source configured to supply one or more pulses of power to the coil, which cause one or more drops of the liquid printing material to flow out of the ejector through a nozzle of the ejector, wherein the one or more drops land and solidify to form a 3D object; and
an oxygen-containing gas source configured to supply a first gas that increases oxidation of the one or more drops, the 3D object, or both.

2. The 3D printer of claim 1,
wherein the oxygen-containing gas source is configured to introduce the first gas into the enclosure;
an inert gas source configured to introduce a second gas into the enclosure, wherein the second gas comprises an inert gas, a nitrogen gas, or both; and
a gas remover configured to remove oxygen from the second gas prior to the second gas being introduced into the enclosure.

3. The 3D printer of claim 2, wherein the inert gas source and the gas remover cause a concentration of oxygen in the enclosure to be less than about 1%.

4. The 3D printer of claim 1, wherein the oxygen-containing gas source is configured to introduce the first gas into the enclosure; and
a gas sensor positioned with the enclosure and configured to measure a concentration of the first gas in the enclosure, wherein the oxygen-containing gas source is configured to introduce an additional amount of the first gas into the enclosure in response to the measured concentration.

5. The 3D printer of claim 4, wherein the first gas comprises oxygen, carbon dioxide, nitrous oxide, ozone, methanol, ethanol, propanol, or a combination thereof.

6. The 3D printer of claim 1, wherein the oxygen-containing gas source is configured to introduce the first gas into the enclosure, wherein the first gas comprises oxygen, wherein the first gas comprises less than 10% of an inert gas, a nitrogen gas, or both, and wherein a concentration of the first gas in the enclosure is from about 1% to about 35%.

7. The 3D printer of claim 6, further comprising an inert gas source that is configured to introduce a second gas into the enclosure at a location that is above where the oxygen-containing gas source is configured to introduce the first gas into the enclosure.

8. The 3D printer of claim 6, wherein the inert gas source is configured to direct the second gas downward around the ejector, the coil, or both, and wherein the oxygen-containing gas source is configured to direct the first gas laterally toward the nozzle, the one or more drops, or both.

9. The 3D printer of claim 1, further comprising:
a pressure sensor positioned within the enclosure and configured to measure a pressure within the enclosure; and
a pump configured to reduce the pressure in response to the measured pressure.

10. The 3D printer of claim 1,
wherein the oxygen-containing gas source is configured to introduce the first gas into the enclosure, and wherein the first gas comprises oxygen;

a temperatures sensor configured to measure a temperature of the first gas proximate to the nozzle, the one or more drops, or both; and a heater configured to increase the temperature of the first gas in response to the measured temperature.

11. The 3D printer of claim 1, wherein the oxygen-containing gas source is configured to introduce the first gas into the enclosure when printing a first portion of the 3D object, and to prevent introduction of the first gas into the enclosure when printing a second portion of the 3D object.

12. The 3D printer of claim 11, wherein the first portion of the 3D object comprises an infill or a perimeter, and wherein the second portion of the 3D object comprises an overhang or a bridge.

13. The 3D printer of claim 1, wherein the a oxygen-containing gas source is configured to supply the first gas while printing a first layer of the 3D object but not while printing a subsequent layer of the 3D object.

14. The 3D printer of claim 1, wherein the oxygen-containing gas source is configured to introduce one or more pulses of the first gas into the enclosure in coordination with the one or more pulses of power to the coil.

15. The 3D printer of claim 1, further comprising:
the enclosure that defines one or more openings, wherein the ejector, the heating element, and the coil are positioned at least partially within the enclosure;
a pressure sensor positioned at least partially within the enclosure and configured to measure a pressure within the enclosure; and
an inert gas source configured to introduce an inert gas or nitrogen gas into the enclosure in response to the measured pressure to cause the pressure within the enclosure to be above atmospheric pressure, which causes the inert gas or nitrogen gas to flow out of the enclosure through the one or more openings, thereby preventing exterior gas from flowing into the enclosure.

16. The 3D printer of claim 1, wherein the ejector, the heating element, and the coil are positioned within the enclosure, and wherein the oxygen-containing gas source is configured to supply the first gas into the enclosure such that the first gas forms a shroud around the nozzle, the one or more drops, the 3D object, or a combination thereof.

17. The 3D printer of claim 1, further comprising an inert gas source configured to supply a second gas that forms a shroud around the ejector, wherein the second gas is supplied at a location that is above where the first gas is supplied, and wherein the second gas comprises an inert gas, nitrogen gas, or a combination thereof.

18. The 3D printer of claim 1, further comprising an inert gas source configured to supply an inert gas or a nitrogen gas that forms a shroud around the ejector, wherein the inert gas source is positioned above the oxygen-containing gas source.

19. The 3D printer of claim 1, wherein the one or more drops form a plurality of layers that are stacked upon one another, and wherein the 3D object comprises the plurality of layers.

20. A three-dimensional (3D) printer, comprising:
a nozzle configured to eject one or more drops of a liquid metal;
a substrate configured to have the one or more drops land thereon and subsequently solidify to form a 3D object;
a first sensor configured to measure a concentration of a first gas, a second gas, or both in a transit region, wherein the transit region comprises a volume that is within 10 cm of the nozzle, the one or more drops, the 3D object, or a combination thereof;
a second sensor configured to measure a pressure in the transit region;
an inert gas source configured to introduce the first gas into the transit region, wherein the first gas source is configured to vary a volumetric flow rate of the first gas in response to the measured concentration, the measured pressure, or both, and wherein the first gas comprises an inert gas, a nitrogen gas, or both; and
an oxygen-containing gas source configured to introduce the second gas into the transit region, wherein the second gas source is configured to vary a volumetric flow rate of the second gas in response to the measured concentration, the measured pressure, or both, and wherein the second gas comprises oxygen that increases oxidation of the one or more drops, the 3D object, or a combination thereof.

21. The 3D printer of claim 20, further comprising:
an enclosure positioned around the nozzle, the substrate, the first sensor, and the second sensor;
an ejector positioned at least partially within the enclosure, wherein the ejector comprises the nozzle;
a heating element positioned at least partially within the enclosure and configured to heat a solid metal in the ejector, thereby causing the solid metal to change to the liquid metal within the ejector;
a coil positioned at least partially within the enclosure and wrapped at least partially around the ejector; and
a power source configured to supply one or more pulses of power to the coil, which causes one or more drops of the liquid metal to be ejected through the nozzle.

22. The 3D printer of claim 21, wherein the first gas is configured to be introduced into the enclosure above the nozzle, wherein the second gas is configured to be introduced into the enclosure below the nozzle, and wherein the second gas is directed at the one or more drops, the 3D object, or both.

* * * * *